(12) United States Patent
Morrison et al.

(10) Patent No.: US 9,300,688 B2
(45) Date of Patent: Mar. 29, 2016

(54) PROTECTED APPLICATION STACK AND METHOD AND SYSTEM OF UTILIZING

(75) Inventors: Kenneth W. S. Morrison, New Westminster (CA); Jay W. Thorne, Port Coquitlam (CA)

(73) Assignee: CA, INC., New York, NY (US)

( * ) Notice: Subject to any disclaimer, the term of this patent is extended or adjusted under 35 U.S.C. 154(b) by 354 days.

(21) Appl. No.: 13/089,180

(22) Filed: Apr. 18, 2011

(65) Prior Publication Data

US 2011/0258692 A1 Oct. 20, 2011

Related U.S. Application Data

(60) Provisional application No. 61/325,335, filed on Apr. 18, 2010.

(51) Int. Cl.
*H04L 29/06* (2006.01)
*G06F 21/53* (2013.01)
*H04L 29/08* (2006.01)

(52) U.S. Cl.
CPC ............ *H04L 63/168* (2013.01); *G06F 21/53* (2013.01); *H04L 63/0218* (2013.01); *H04L 67/10* (2013.01)

(58) Field of Classification Search
CPC .................................................... H04L 63/168
USPC ............................................................ 726/3
See application file for complete search history.

(56) References Cited

U.S. PATENT DOCUMENTS

| | | | |
|---|---|---|---|
| 7,409,719 B2* | 8/2008 | Armstrong et al. | 726/24 |
| 8,353,031 B1* | 1/2013 | Rajan et al. | 726/22 |
| 2001/0056461 A1* | 12/2001 | Kampe et al. | 709/201 |
| 2005/0159927 A1* | 7/2005 | Cruz et al. | 702/188 |
| 2010/0077445 A1* | 3/2010 | Schneider et al. | 726/1 |
| 2010/0325474 A1* | 12/2010 | Gopinath et al. | 714/4 |
| 2010/0332617 A1* | 12/2010 | Goodwin et al. | 709/219 |
| 2011/0072504 A1* | 3/2011 | Abderrazzaq et al. | 726/11 |
| 2011/0107411 A1* | 5/2011 | McClain et al. | 726/9 |

OTHER PUBLICATIONS

Hwang et al., Cloud Securty with Virtualized Defense and Reputatio-based Trust Management, 2009, Retrieved from the Internet <URL: ieeexplore.ieee.org/xpls/abs_all.jsp?arnumber=5380613>, pp. 1-6 as printed.*

Castrucci et al., Enhancing Java ME Security Support with Resource Usage Monitoring, 2008, Retrieved from the Internet <URL: link.springer.com/chapter/10.1007/978-3-540-88625-9_17>, pp. 1-11 as printed.*

Schoo et al.; Challenges for Cloud Networking Security; Sep. 2010; Retrieved from the Internet <URL: hpl.hp.com/techreports/2010/HPL-2010-137.pdf>; pp. 1-17 as printed.*

(Continued)

*Primary Examiner* — Saleh Najjar
*Assistant Examiner* — Simon Kanaan
(74) *Attorney, Agent, or Firm* — Vierra Magen Marcus LLP

(57) ABSTRACT

A secure appliance for use within a multi-tenant cloud computing environment which comprises: a) a policy enforcement point (PEP); b) a hardened Operating System (OS) capable of deploying applications; and c) at least one application capable of hosting services and application program interfaces (APIs).

19 Claims, 11 Drawing Sheets

(56) References Cited

OTHER PUBLICATIONS

Chieu et al.; Dynamic Scaling of Web Applications in a Virtualized Cloud Computing Environment); 2009; Retrieved from the Internet <URL: http://ieeexplore.ieee.org/stamp/stamp.jsp?arnumber=5342101>; pp. 1-6 as printed.*

No stated author; Symantec—Administration Guide for Symantec Endpoint Protection and Symantec Network Access Control; 2008; Retrieved from the Internet <URL: ftp.symantec.com/public/english_us_canada/products/symantec_endpoint_protection/11.0/manuals/mr4/administration_guide.pdf>; pp. 1-67 as printed.*

No stated author; Using Microsoft Loopback Adapter; Apr. 2009; Retrieved from the Internet <URL: technet.microsoft.com/en-us/library/cc708341>; pp. 1-3 as printed.*

No stated author; Symantec-Enterprise—Best Practices for Symantec Endpoint Protection in Virtual Environments; Jan. 2009; Retrieved from the Internet <URL: symantec.com/docs/TECH95300>; pp. 1-3 as printed.*

Canadian Office Action dated Apr. 15, 2013, Canadian Patent Application No. 2,737,631.

Response to Canadian Office Action dated Oct. 15, 2013, Canadian Patent Application No. 2,737,631.

* cited by examiner

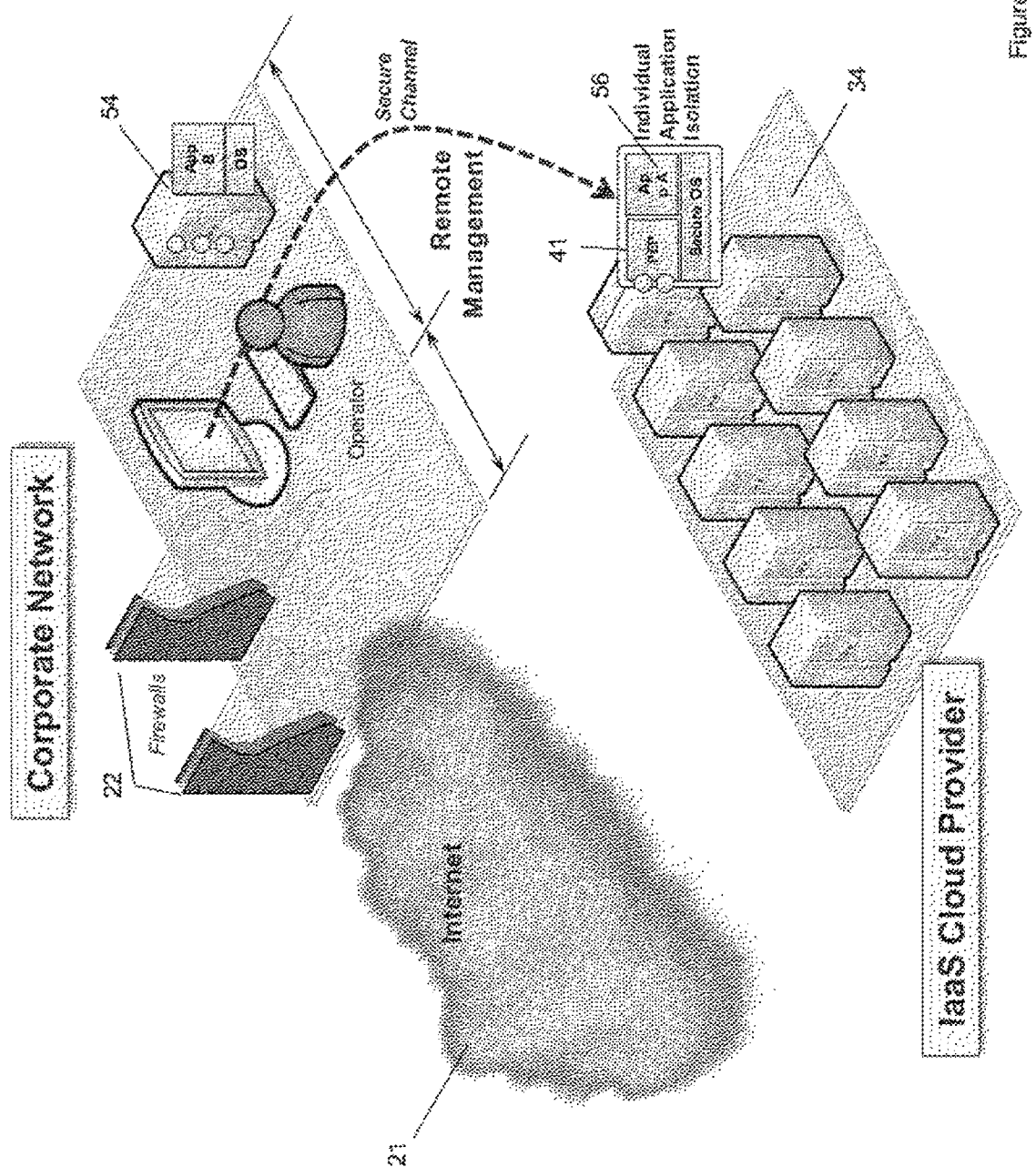

PROTECTED APPLICATION STACK AND METHOD AND SYSTEM OF UTILIZING

CLAIM OF PRIORITY

This application claims priority to U.S. Provisional Application No. 61/325,335, "PROTECTED APPLICATION STACK," filed on Apr. 18, 2010, which is incorporated herein by reference in its entirety.

FIELD OF THE INVENTION

The present invention relates to Information Technology (IT), and more particularly to virtualization, and yet more particularly to large scale virtualization in cloud computing environments.

BACKGROUND OF THE INVENTION

Service-Oriented Architecture (SOA) is an approach for creating loosely coupled, highly composable services and APIs in organizations with large IT centers. SOA became very popular in the early part of the $21^{st}$ century as large enterprises searched for a better approach to delivering applications fast and efficiently. SOA was also seen as an appropriate strategy to address the growing need for organizations to share information across their own boundaries, with business partners, government agencies, customers, and the public at large. However, over time, the term SOA became associated with overreaching and ill-fated attempts to re-invent IT in the enterprise. Many of these initiatives ultimately failed, and the term rapidly fell into pejorative use.

Nevertheless, the fundamental concepts of SOA—building loosely coupled interfaces for well-described functions, leveraging highly successful and ubiquitous Web transports as the substrate of distributed communications—were sound and very much needed by any organization attempting to publish functionality to customers, partners, and its own staff. There has been a significant shift from the complex protocols most often associated with SOA (XML messaging, SOAP envelopes, multiple transport bindings) to much simpler and more lightweight approaches using the principles of the RESTful architectural style, which advocates that distributed computing should follow the fundamental architecture of the World-Wide Web. This trend toward simplicity and ease of development touches content models (JSON replacing XML), identity (OAuth and API keys replacing more sophisticated security tokens such as SAML or username/password combinations), and transport (now exclusively HTTP). Even the word "service" is gradually being replaced by API, with the later implying the same principles but generally being associated exclusively on HTTP transport, RESTful invocations, and JSON content. In this document we will use the two terms together—that is, service/API—as at their core they represent the same basic concept describing the best practices to publish componentized functionality.

Regardless of the architectural flavour, the basic challenge an organization faces when publishing a service/API is securing it. Access control is one important aspect of security. Making a service/API available to the outside world involves deploying a publically accessible endpoint, which may be challenging because of perimeter security models employed in most organizations (this is illustrated in FIG. 1). Restricting access based on identity—the process of authentication and authorization—is a part of this. Related to access control is audit, and in particular capturing a permanent record of who-is-accessing-what. Many organizations now want to monetize their services/APIs, so accurate capture of the callers identity is essential for billing purposes. Detection of Internet-based threats, such as SQL injection or Cross-site Scripting (XSS) is another important security function that must be applied to all services and APIs.

There are other aspects of management of services/APIs that while not related to security are nonetheless essential in a robust distributed computing environment. Monitoring of transactions is important both for operationally continuity, and access to historical information is critical for troubleshooting and formal forensic investigation. Message transformation is useful for versioning or adaptation of mismatched clients and servers. Rate limiting is important to protect systems from bursts of traffic which might adversely affect overall performance.

Any system that is directly exposed to Internet transactions must also be hardened to withstand potential attack. Typically this involves complex operating system (OS) configuration and continuous attention to patches and emerging threat vectors. Hardening systems is a difficult task requiring very specialized skills and knowledge. Many organizations lack these skills, and so many systems are compromised not through exploitation of a service/API they host, but through exploitation of the underlying OS that contains unaddressed vulnerabilities.

It is certainly possible to apply all of the above functions to each individual application and server in an organization's network. However, this approach does not scale well, especially in a diverse environment with different architectures and operating systems. Consistency is a fundamental concept in good security, and this is extremely difficult to achieve simultaneously across multiple systems. Furthermore, embedding access control, transformation, audit, etc into service/API implementation is an extremely inflexible solution. Any changes to the policy these actions embody may demand a new compile cycle with associated testing and formal migration through environments including development, test, and production. A seemingly minor policy change in an organization, such as update of a trusted certificate, can have a ripple effect on production systems, each of which must be individually updated.

One currently used system to address this issue is to deploy an intermediate Policy Enforcement Point (PEP) as a security gateway between the client and the service/API. This is most commonly deployed in the DMZ, and acts as a reverse proxy brokering communications to internal systems hosting services and APIs (see FIG. 2).

The PEP is a security-hardened platform that is designed to be a buffer between the Internet and internal systems that are not deployed on platforms that are DMZ-ready (meaning sufficiently hardened against sophisticated Internet-originating attacks). The PEP takes on responsibility for security and monitoring of applications. This includes authentication, authorization, audit, message transformation, routing, rate limiting, transport mediation, orchestration between services/APIs, etc. These are all elements of policy that act on a connection request.

Delegating the above functions to the PEP means that these functions are decoupled from code and local implementation. This has a number of benefits. It promotes reuse and thus consistency. It is declarative, so policy is easily modified to accommodate changing requirements or address emerging threats. But more important, it places security responsibility into the hands of dedicated security professionals, rather than distributing it among developers who may not understand the scope of the problem they must address.

This best practice is known as perimeter-security model. The PEP is effectively a border-guard stationed at the perimeter, using policy to grant access to clients. It allows internal servers to rely completely on the PEP for security and monitoring, greatly simplifying their implementations. In particular, it allows internal systems to be deployed on general purpose operating systems that use no specialized security hardening. Overall this greatly simplifies security management and monitoring of services/APIs in an organization. However, it also means that internal systems are completely reliant on the PEP-guarded perimeter security model, and thus are not easily moved to a different environment with a higher risk profile. More specifically, it becomes very difficult to migrate perimeter-secured, internal applications hosting services/APIs outside to cloud environments.

Cloud computing promises to make the deployment and operation of applications more agile and offer customers an opportunity to rapidly scale their application instances up or down in response to changing resource requirements, while under a pay-for use model that promises to revolutionize the delivery of IT services. To accomplish this, cloud computing systems leverage technologies such as virtualization. Cloud computing service providers deploy virtualization infrastructure en mass over farms of commodity servers, providing a multi-tenancy operating model to their customers. The use of this commoditized infrastructure and centralized management allow for vast economies of scale to be achieved, thus driving down costs for IT.

Cloud allows an organization to shift its budget focus from CAPEX-dominated budgets (equipment acquisition, long lead times) to smaller OPEX-focused budgets (pay-for-use, instant access and scaling). This model is very attractive to CIOs and CEOs, who see IT as critical to their business, but not something their organization is necessarily effective at. Outsourcing to cloud eliminates capital expense and leverages outside expertise in day-to-day system operations.

Cloud is generally characterized according to definitions put forward by NIST. The NIST definition outlines three major cloud instantiations: Software-as-a-Service (SaaS), Platform-as-a-Service (PaaS) and Infrastructure-as-a-Service (IaaS). SaaS basically describes fee-for-service web sites that satisfy important business functions, such as Customer Relationship Management (CRM) or office applications. Salesforce.com and Google docs are two such examples of SaaS cloud computing. SaaS has specific limitations in what customers can do. SaaS customers can basically customize screen flow and work on data; however they cannot load arbitrary applications into a SaaS cloud.

PaaS provides the building blocks of applications, such as databases, application servers, directories, queuing software, etc. PaaS is intended as a curated stack of critical production development infrastructure that is available to developers so they don't need to worry about installing and operating them—they are just available and maintained by the PaaS provider. Developers deploy code—such as Java, PHP, Ruby, .NET framework languages, Python, etc—into the PaaS containers. Of the three instantiations of cloud, PaaS is probably the least defined at this time, but arguably has the greatest future potential. Microsoft's Azure, and VMware/Salesforce.com's VMForce are PaaS initiatives.

IaaS is basically mass virtualization infrastructure for hire. Customers of IaaS providers take standardized virtual images of their applications (which include both the OS and their application) and run this in the cloud provider's infrastructure, as illustrated in FIG. 3. The provider maintains a large data center of commodity servers (CPUs/memory), distributed storage space (usually SAN disks), and network elements. All of the infrastructure is shared in an attempt to get very high utilization rates and keep costs down. The uniformity of the environment means that vast economies of scale can be achieved, in hardware, in process, and in people running the service.

IaaS cloud computing is the focus of the innovation that is to be described here. Subsequent references to cloud computing should be taken to imply IaaS clouds.

Cloud computing in general, however, introduces a number of new risks and challenges around data and applications. Many of these are a by-product of the shift from a private computing environment to a multi-tenancy environment, the transfer of control of infrastructure from local IT staff to a cloud service provider, and the loss of the perimeter security model. These issues conspire to erode confidence in the emerging cloud computing trend among IT managers, and slow the uptake of cloud technology.

In the IaaS cloud, no perimeter-buffer exists. Every application stands on it's own, completely accessible from the outside world. These applications are thus subject to all of the risks of an application deployed in a corporate de-militarized zone (DMZ). In addition, this threat is elevated by virtue of residing in a cloud provider, such as Amazon's EC2. As cloud providers gather a large number of applications into a readily accessible space, they are obvious targets for system crackers. Thus, every application in the cloud must be hardened to be resilient to external attack.

This radically different risk profile from the enterprise data center makes it difficult to migrate existing enterprise applications to the cloud. These applications are generally built under the assumption that a security perimeter is in place, and that a PEP may be in place to delegate security and monitoring processing. The application is deployed on an un-hardened operating system, and the application may have no capabilities for sophisticated access control models, threat detection, rate limiting, etc. Thus, the application hosting the service/API is highly vulnerable to compromise if moved to the cloud unchanged. This is illustrated in FIG. 4.

One solution might be to put a PEP in the cloud, insulating the application from direct outside access. This may work in some controlled situations, but few cloud environments support isolation models that can guarantee that there is no way for an outside party to end-run around the PEP and contact the application directly. This is a side-effect of the surrender of control organizations subject themselves to when they move to the cloud. In a multi-tenant environment, it is generally not possible to impose traditional restrictions on routing to accommodate the needs of a single customer.

There is a further internal threat which must also be considered. Cloud providers attempt to achieve very high utilization of CPU, storage, and network resources so they may maximize profit potential. An effective cloud provider will have hardware utilization rates that far exceed a typical organization because they run multiple virtual images simultaneously on the hardware. This means, however, that an organization may not have exclusive access to the hardware their applications run on. A competitor—or a system cracker—may be running on the same machine, in a separate virtual image space. Modern hypervisors are very effective at isolating access between images (meaning no visibility into memory space of another image, no ability to put network drivers into promiscuous mode to see traffic not intended for this image, etc); however, normal network access is generally permitted (such as a socket connections from one application to another). Therefore, every application in a multi-tenant environment must consider the potential threat of connections from a hostile party also running internal to the cloud provider (see FIG. 5). This is another reason that perimeter-deployed PEPs are not effective in cloud environments. Even if they could restrict outside traffic from connecting to an internal application, they cannot easily mitigate internal threats.

The foregoing issues all result from the fundamental differences in deployment environment between the private organization and the cloud, and the surrender of network control that is necessary when an organization moves to a cloud provider. The private organization has complete control over their network topology. They can configure switches, routers, and firewalls to build an effective DMZ-based perimeter security model that supports deployment of PEPs. This allows internal systems to completely delegate security and monitoring responsibility to the PEP; thus, these systems can be quite insecure themselves.

In the cloud, customers surrender all control of network topology and operate in a multi-tenant environment where all running images are accessible from the Internet and moreover from other internal hosts. Thus, every app moved into the cloud must run on a security hardened platform, and by extension must independently implement all aspects of security and monitoring that otherwise would be the responsibility of a dedicated PEP. If an organization has a large number of applications, this represents tremendous effort and a huge potential ongoing maintenance burden.

At present, there is no integrated solution that offers a complete answer to this challenge. There are some partial solutions, but each falls considerably short of providing a simple way to secure and manage applications in the cloud.

Rightscale (http://www.rightscale.com/) offers a solution for automation and management of Infrastructure-as-a-Service (IaaS) cloud-based solutions. They do not address application transaction security, nor they do not monitor application transaction activity. Their solution is aimed much more at managing the elastic scaling of images.

Symplified (http://www.symplified.com/) offer cloud single-sign on and access control. Their method uses a centralized, cloud-based authentication broker. This is their PEP equivalent, and it has only limited policy enforcement capabilities (mainly focused around simple HyperText Transfer Protocol (HTTP) and Representational State Transfer (REST) based communications). Their solution is cloud based, so forces application developers to harden their images and provide simple access control from the Symplified servers. (It should be noted that cloud-based here does not imply it provides any isolation or benefit from possibly executing in the same cloud as the target service. It is still possible to end run around these solutions and get direct access to the running application either from the Internet or within a cloud provider.)

Mashery (http://www.mashery.com/) provides a cloud-based solution for simple access control, rate limiting, and activity monitoring. However, developers still must harden their own systems and provide basic access control to ensure that only connections from the remote Mashery server are accepted.

Similarly, APIgee (http://www.apigee.com/) and 3Scale (http://www.3scale.com/) offer simple cloud-based authentication and activity monitoring systems. APIgee has both a cloud-based solution and a regular enterprise on-premise PEP.

3Scale does provide agents for integration into an application. This agent communicates with a cloud-based Policy Decision Point (PDP) to render access control decisions. This agent provides some rudimentary access control protection, as well as a scheme to do simple rate limiting; however it does nothing to provide real isolation of the application in the cloud, assist in hardening the baseline images, or any other features of a comprehensive PEP such as routing, orchestration, message transformation, etc.

Amazon Web Services (AWS, at http://aws.amazon.com/) has an isolation offering called Virtual Private Cloud (VPC), which creates a network-based isolation layer around all of an organization's running images. It ties this isolated sub-cloud into an enterprise's on-premise network with a VPN. Thus, the VPC becomes effectively a data annex for the enterprises. All communication to or from cloud-resident images must go back to the enterprise and proceed past the regular corporate perimeter security model.

VPC is an effective solution for carving out part of the cloud and using it as a data annex; however, there are drawbacks. If a cloud-based application is compromised (an outcome that is much more likely for a cloud-resident application than a local one), it has a direct path back into the enterprise as a trusted host. Organizations must trust completely the isolation model in the cloud, the details of which are not shared by the provider. Under these circumstances, it is difficult to be certain that VPC is not subject to compromise. Nevertheless, up to now, VPC is probably the best available solution for organizations who want to carve out part of the cloud as a private data center annex.

CloudSwitch (http://www.cloudswitch.com/) provides a solution similar to Amazon's VPC, with a particular emphasis on dynamically switching work loads out into the Amazon cloud in a secure manner. It is subject to the same connection restrictions of Amazon's VPC.

VMware (http://www.vmware.com/) has been working to provide levels of network isolation in the cloud using virtual networking. Their vShield Edge product allows cloud providers that use Virtual Cloud Director (vCD) to create layer 2 and 3 network isolation zones that contain multiple running virtual machine images. Thus, virtual DMZ's can be created, and virtual PEPs can be deployed in these to protect applications hosting services/APIs in a virtualized secure zone.

The drawback to this approach is that it only works in clouds built in the VMware vCD infrastructure, which is proprietary. vShield is an integral part of the offering and cannot be easily moved to a non-VMware environment, such as a Xen-based environment like Amazon Web services.

There are various approaches to provisioning using assemblies. 3Terra (http://www.3terra.com/) has a product that supports composition and deployment of multi-tier applications in the cloud. It support provisioning and scaling up/down, and monitoring and visibility based on instrumentation of virtual images. However, it does not monitor transactions at the application protocol level. Furthermore, 3Terra does not offer a security solution.

The Open Virtualization Format (OVF, see http://www.d-mtf.org) has a packaging structure for multi-image applications. This addresses portability and packaging; however it does not offer scalability, monitoring, or security.

The lack of a simple solution to these basic security and management problems is keeping organizations from undertaking wide scale deployment of applications into the cloud. It is an object of the present invention to obviate or mitigate the above disadvantages.

SUMMARY OF THE INVENTION

According to a first aspect of the present invention there is provided a secure appliance for use within a multi-tenant cloud computing environment which comprises:

a) a policy enforcement point (PEP);
b) a hardened Operating System (OS) capable of deploying applications; and
c) at least one application capable of hosting services and application program interfaces (APIs).

According to a second aspect of the present invention, there is provided a baseline image with integrated PEP functionality.

According to a third aspect of the present invention, there is provided a system for providing security in communications between a first computer and a second computer, said second computer being within a cloud computing environment, comprising:

a) a virtual image of an operating system (OS) on said second computer, said operating system having restricted shell access and said operating system including a firewall;
b) a policy enforcement point (PEP) installed on said operating system image, said PEP being capable of receiving communications to said second computer, retrieving a policy based on characteristics of said communication and executing said policy on said communication, such that if said policy allows for said communication to reach said second computer, this may be implemented using local host addressing to transmit said communication.

Much has been made recently in regards to security challenges relating to cloud computing. Fortify Software (www.fortify.com) sponsored a survey of 100 hackers and discovered that 96% of the respondents think that the cloud creates new opportunities for hacking, and 86% believe that "cloud vendors aren't doing enough to address cyber-security issues."

Continuity and consistency are important principles in security. In the cloud, continuity breaks down in the hand-off of control between the provider and their customers, and potential exploits often appear at this critical transition. IaaS provides a sobering demonstration of this risk very early in the customer cycle. The pre-built OS images that most IaaS cloud providers offer are often un-patched and out-of-date.

The world is full of ex-system administrators who believe that simply having a patched, up-to-date system was an adequate security model. Unfortunately, hardening servers to be resilient when exposed to the open Internet is a discipline that is time-consuming and complex. However, in reality, the cloud is the new DMZ. As such, every publicly accessible server must address security with the same rigor and diligence of a DMZ-based system. But ironically, the basic allure of the cloud—that it removes barriers to deployment and scales rapidly on demand—actually conspires to work against the detail-oriented process that good security demands. It is this dichotomy that is the opportunity for system crackers. Uneven security is the irresistible low-hanging fruit for the cloud hacker.

The appliance, system and method of the present invention reconcile the twin conflicts of openness and security in the cloud. In one aspect, there is provided a cloud-based virtual appliance. Customers may use this image as a secure baseline to deploy their own applications. Importantly, the appliance includes a hardened OS image which boots in a safe and resilient mode from first use.

This invention solves the problem of securing and managing applications deployed in IaaS cloud environments. It provides:

1. A trusted and secure operating system on which to load applications. This solves the problem of building a secure baseline for applications, which is a highly specialized task.
2. Restricted communication to and optionally from the application, through the PEP. Application-layer communications are thus under complete policy control and administered by application owners, not necessarily cloud providers.
3. A close binding between PEP and application through the generic localhost network entity abstraction. This eliminates the problem of dependency on explicit IP address, which is problematic in an elastic cloud environment.
4. Visibility into application state through metrics collected by the PEP. This includes both current state and historical data.

The system according to the invention would be useful to those needing to deploy and rapidly scale applications into a cloud based on a virtualized infrastructure, and to do so in a secure manner and with the ability to retain operational visibility into the applications. The system provides a secure baseline from which to operate, simple provisioning of instances, fine-grained policy control over communications, visibility into application communications, and rapid scaling with consistent application of security across all instances.

The system according to the invention provides value to a number of parties. Customers of cloud providers retain control over security of their applications. This offsets the loss of control experienced when moving applications into the cloud; as such customers lose the ability to implement traditional, perimeter-based security for such applications. This solution provides assertion of application security and control while still deriving benefit from the elastic computing model upon which the cloud is based.

Cloud providers are provided a means to securely deploy new services and protect service APIs. The basic cloud IaaS marketplace is expected to be highly competitive and offer very thin profit margins, therefore significant revenues will be derived from higher-level value-added services. Providers need a mechanism to secure and monitor these services, and CloudProtect images can provide such benefits.

BRIEF DESCRIPTION OF THE DRAWINGS

The accompanying drawings, which are incorporated in and constitute a part of this specification, illustrate embodiments of the present teachings and together with the description, serve to explain the principles of the present teachings. Like numerals refer to the same feature throughout all figures. In the figures:

FIG. 11 illustrates the channel of data use from a given PEP or secure stack.

PREFERRED EMBODIMENTS OF THE INVENTION

Figure 1:
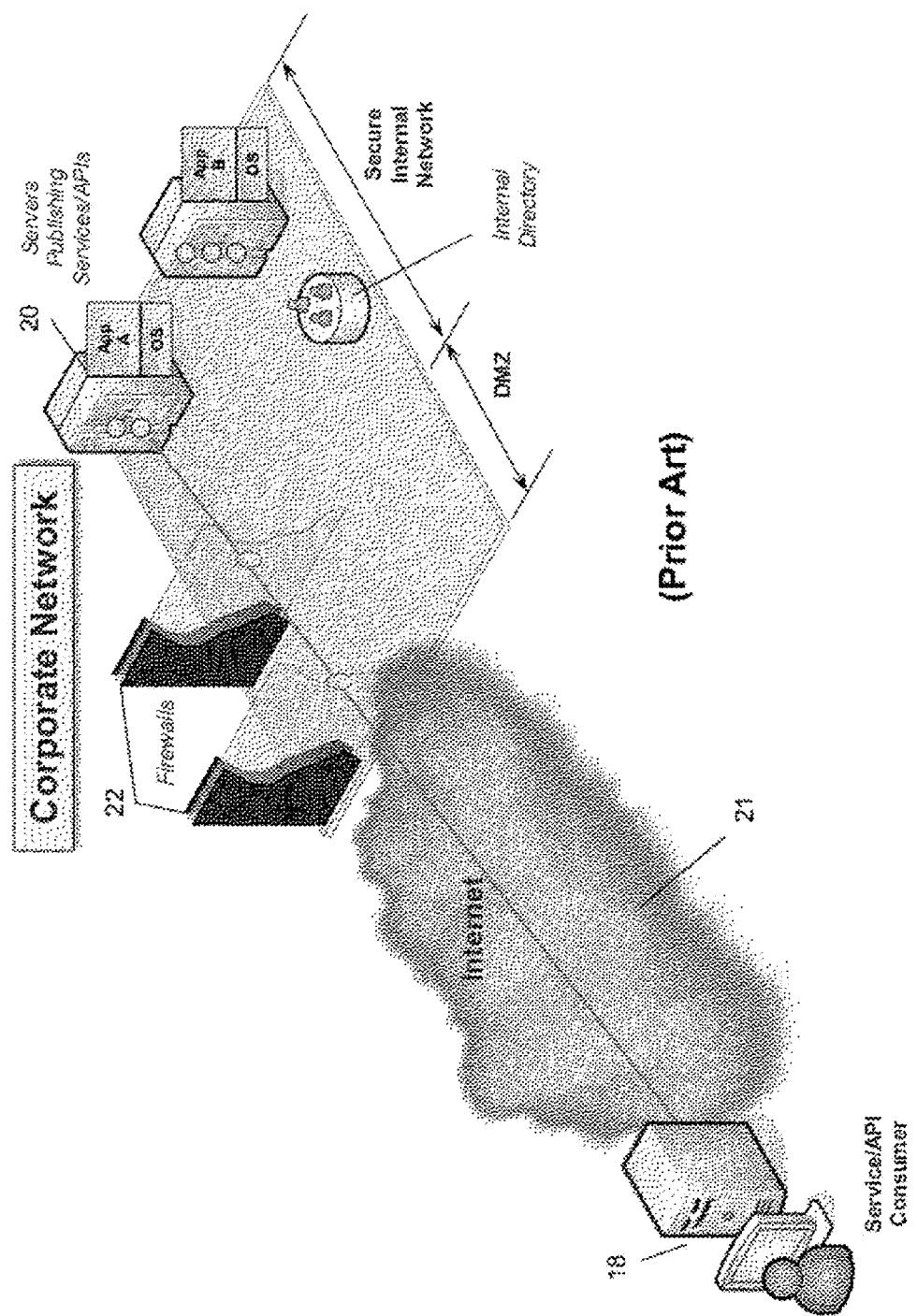
FIG. 1 illustrates a conventional structure of a corporate network in which service/API seeking user seeks to access to the server's publishing services or APIs.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured The following discussion provides a brief and general description of a suitable computing environment in which various embodiments of the system may be implemented. Although not required, embodiments will be described in the general context of computer-executable instructions, such as program applications, modules, objects or macros being executed by a computer.

A computer system (both user and cloud computing host) may be used as a server including one or more processing units, system memories, and system buses that couple various system components including system memory to a processing unit. Computers will at times be referred to in the singular herein, but this is not intended to limit the application to a single computing system since in typical embodiments, there will be more than one computing system or other device involved. Other computer systems may be employed, such as conventional and personal computers, where the size or scale of the system allows. The processing unit may be any logic processing unit, such as one or more central processing units ("CPUs"), digital signal processors ("DSPs"), application-specific integrated circuits ("ASICs"), etc. Unless described otherwise, the construction and operation of the various components are of conventional design. As a result, such components need not be described in further detail herein, as they will be understood by those skilled in the relevant art.

A computer system includes a bus, and can employ any known bus structures or architectures, including a memory bus with memory controller, a peripheral bus, and a local bus. The computer system memory may include read-only memory ("ROM") and random access memory ("RAM"). A basic input/output system ("BIOS"), which can form part of the ROM, contains basic routines that help transfer information between elements within the computing system, such as during startup.

The computer system also includes non-volatile memory. The non-volatile memory may take a variety of forms, for example a hard disk drive for reading from and writing to a hard disk, and an optical disk drive and a magnetic disk drive for reading from and writing to removable optical disks and magnetic disks, respectively. The optical disk can be a CD-ROM, while the magnetic disk can be a magnetic floppy disk or diskette. The hard disk drive, optical disk drive and magnetic disk drive communicate with the processing unit via the system bus. The hard disk drive, optical disk drive and magnetic disk drive may include appropriate interfaces or controllers coupled between such drives and the system bus, as is known by those skilled in the relevant art. The drives, and their associated computer-readable media, provide non-volatile storage of computer readable instructions, data structures, program modules and other data for the computing system. Although a computing system may employ hard disks, optical disks and/or magnetic disks, those skilled in the relevant art will appreciate that other types of non-volatile computer-readable media that can store data accessible by a computer system may be employed, such a magnetic cassettes, flash memory cards, digital video disks ("DVD"), Bernoulli cartridges, RAMs, ROMs, smart cards, etc.

The problem that this invention addresses is how to effectively secure and manage applications and data deployed in multi-tenant, Infrastructure-as-a-Service (IaaS) cloud environments. It seeks to provide a solution that offers the following benefits:

A secure baseline operating system for deployment of applications and data.

The ability to rapidly scale up or down without adding complexity to the secure deployment.

Simple provisioning of applications and data into the cloud environment.

Remote control of application communications by application owners.

Policy-based control of all application layer communications in or out of the cloud application.

Application visibility and monitoring through analysis of all application protocol communications.

Figure 2:
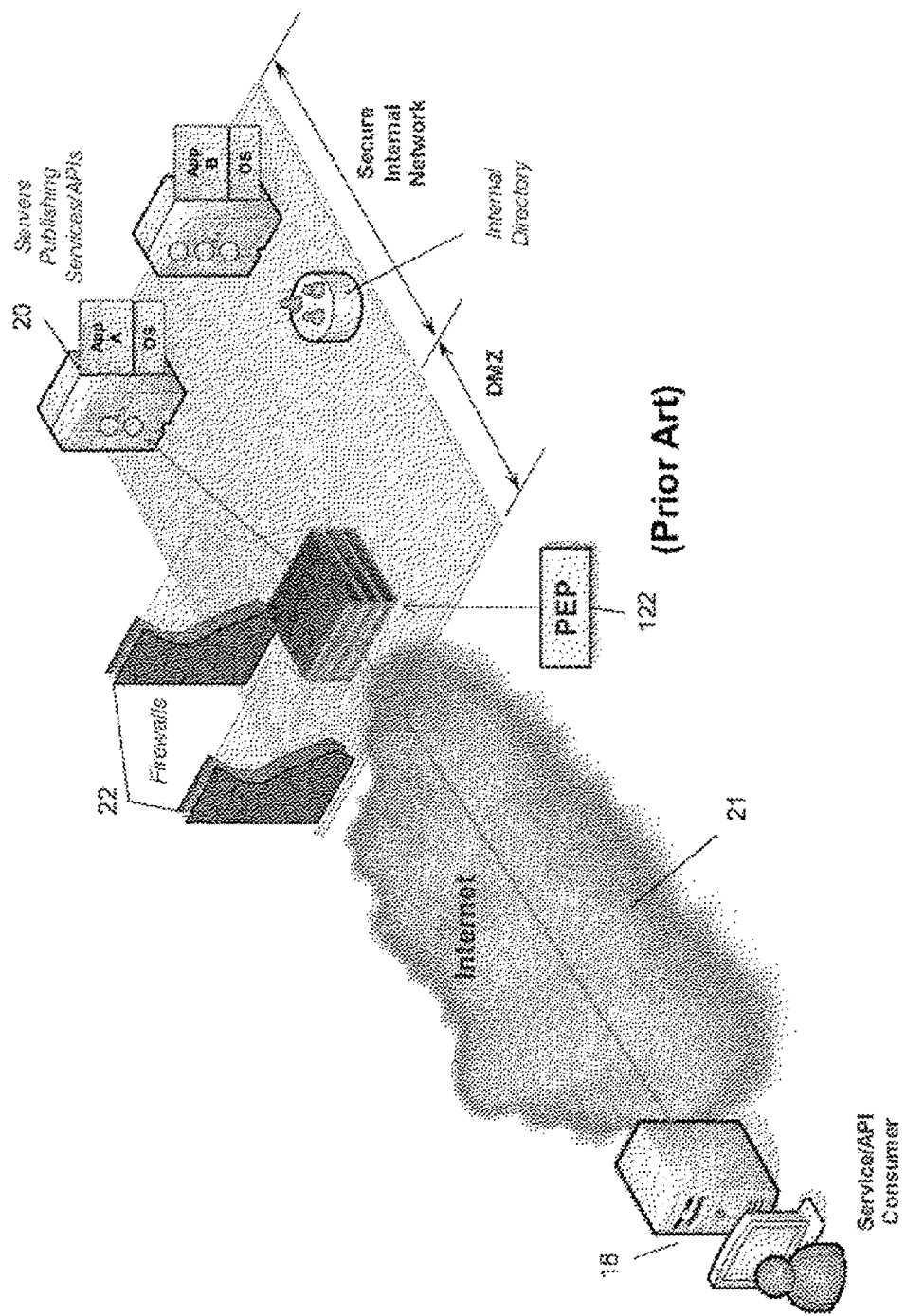
FIG. 2 illustrates a structure similar to FIG. 1 but additionally including a PEP.
Figure 3:
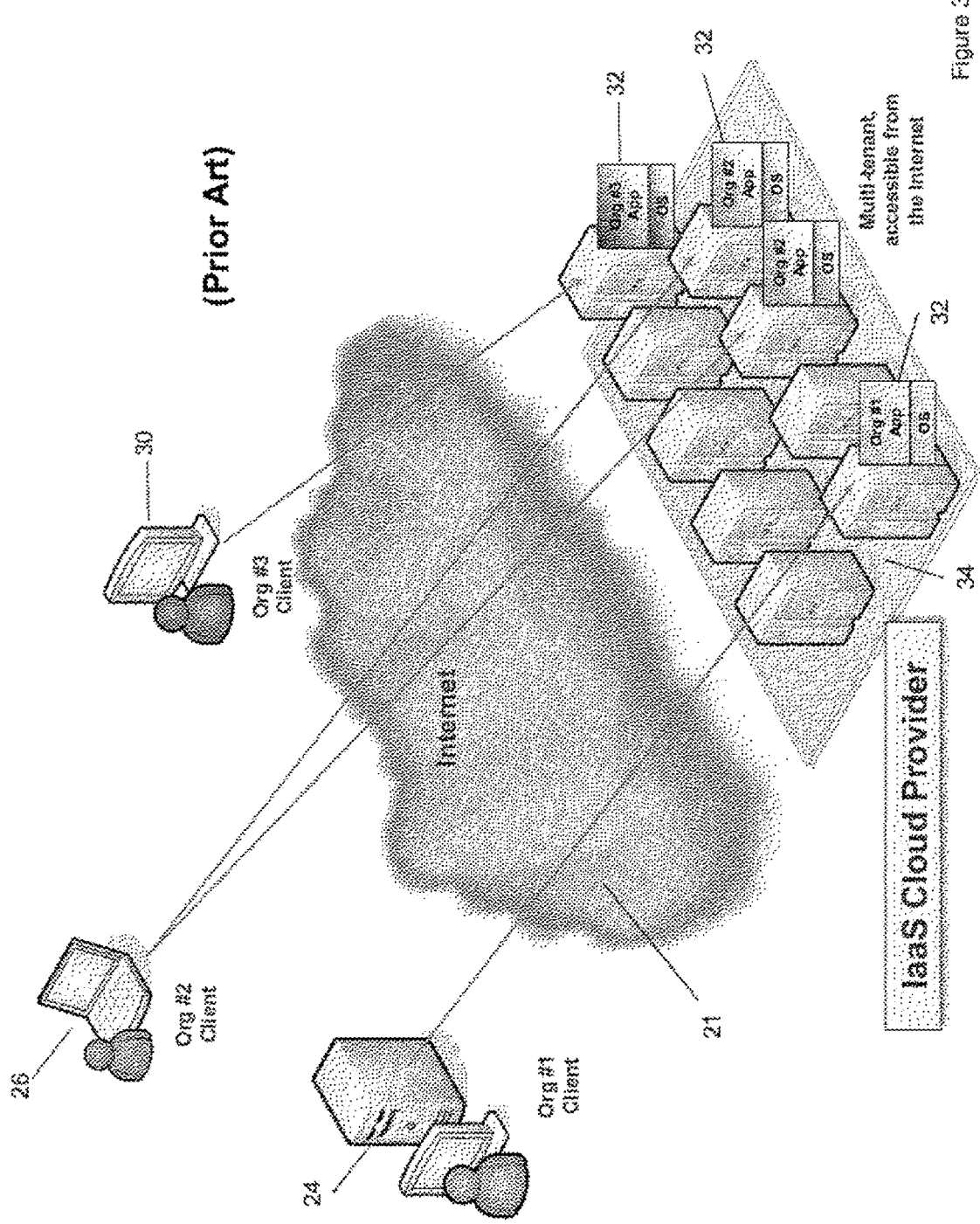
FIG. 3 illustrates an overall cloud system architecture with three clients using IaaS cloud provider.
Figure 4:
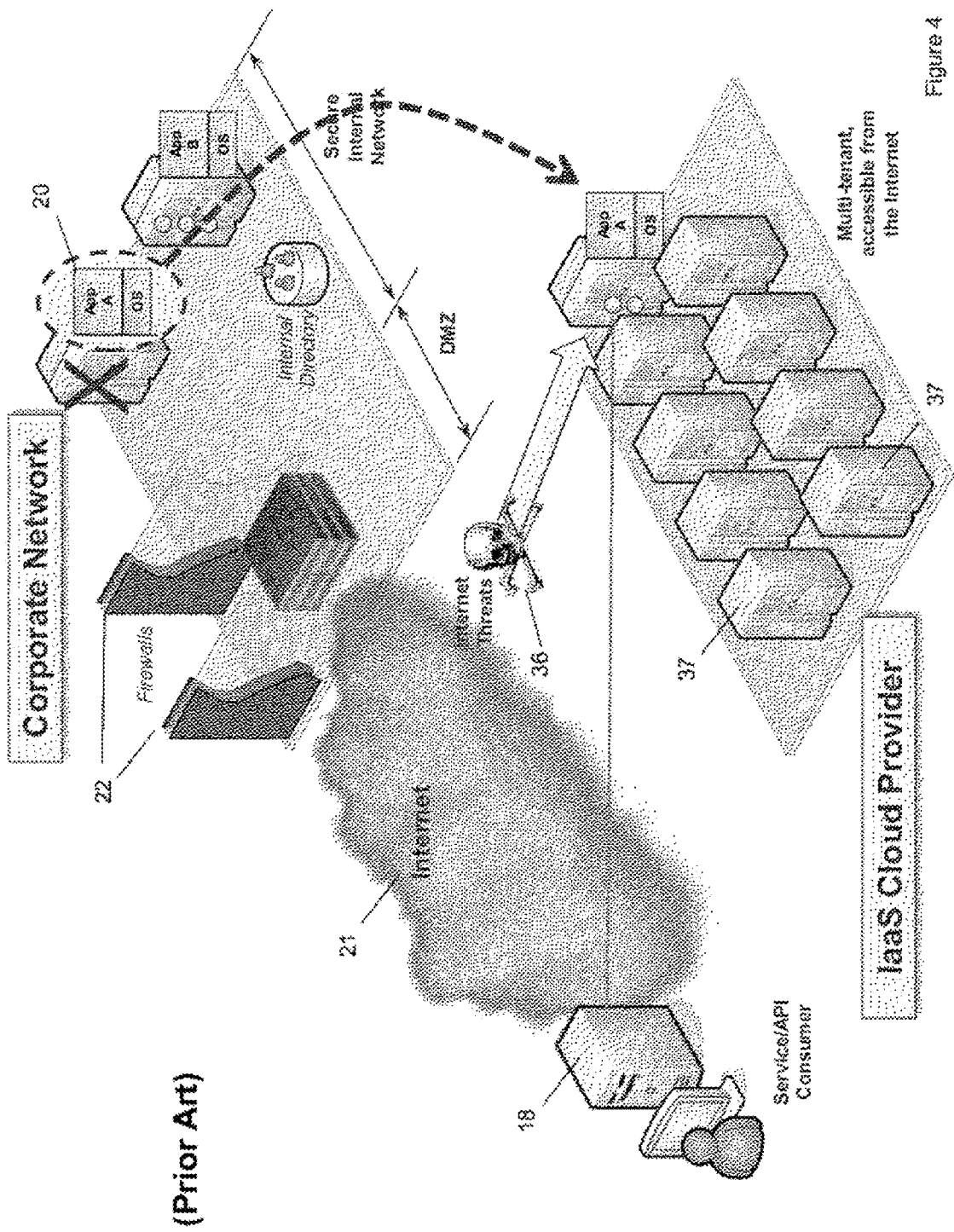
FIG. 4 illustrates an overall cloud system architecture depicting the offloading of functions to cloud provider, while further showing the system risk once out of DMZ.
Figure 5:
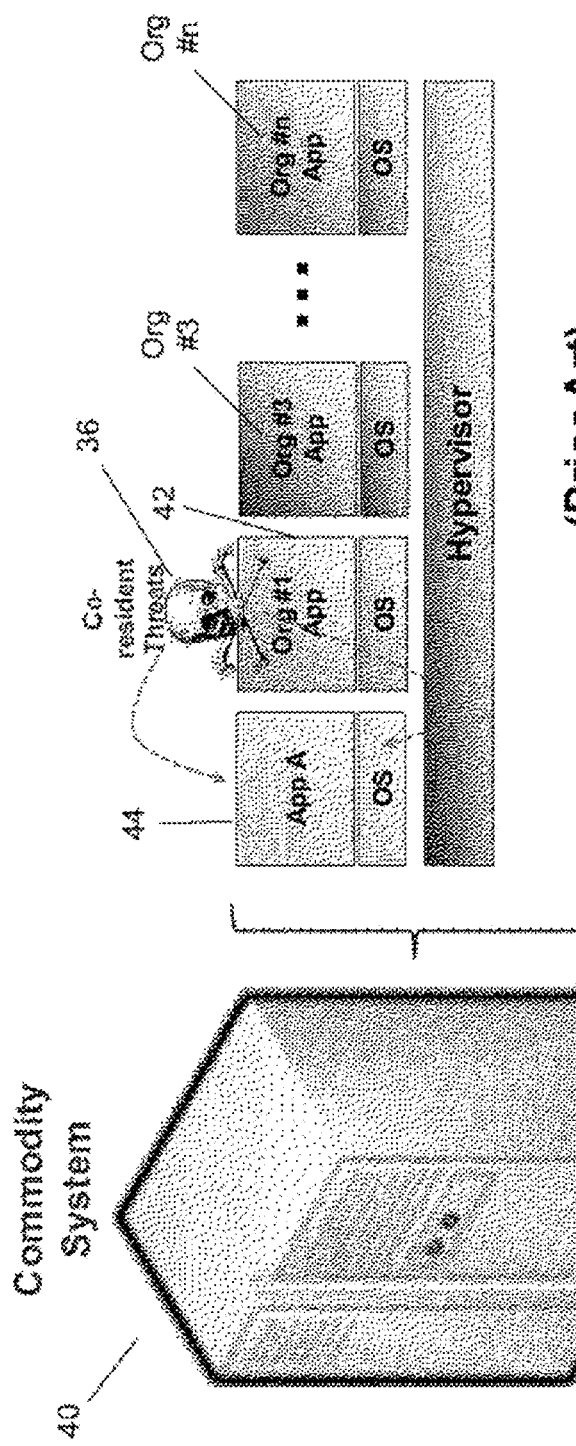
FIG. 5 illustrates further showing the system risk once out of DMZ and in commoditized cloud system.

FIGS. 1-5 show the basic state of the art. FIG. 1 provides a conventional structure of a corporate network in which service/API seeking user 18 seeks to access to the server's publishing services or APIs 20 over internet 21. Firewalls 22 are in place in the DMZ. FIG. 2 a structure similar to FIG. 1 but additionally including a PEP 122. FIG. 3 provides a series of clients 24, 26 and 30 attempting to access data of company X (cloud provider) by way of IaaS provider 34. Reference 32 presents each company's OS and App as running "remotely" in the cloud. FIG. 4 illustrates, with a structure as depicted in FIG. 3, internet threats 36, profiled due to the fact that applications are built with presumption that security perimeter is in place. FIG. 5 further illustrates the vulnerability of surrendering policy creation (threat conveyance unimpeded from Org #1 App 42 to App A 44, all within commodity system 40).

Within the present invention, the terms "PEP appliance", "appliance", "protected application stack" and its brand name CloudProtect™ may be used interchangeably. No inference of limitation of the scope of the present invention should be taken expressly or impliedly by these alternatives.

As used herein, a "cloud" can comprise a collection of resources that can be invoked to instantiate a virtual machine, process, or other resource for a limited or defined duration. As shown for example in FIGS. 4 and 5, the collection of resources supporting a cloud can comprise a set of resource servers 37 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

Figure 6:
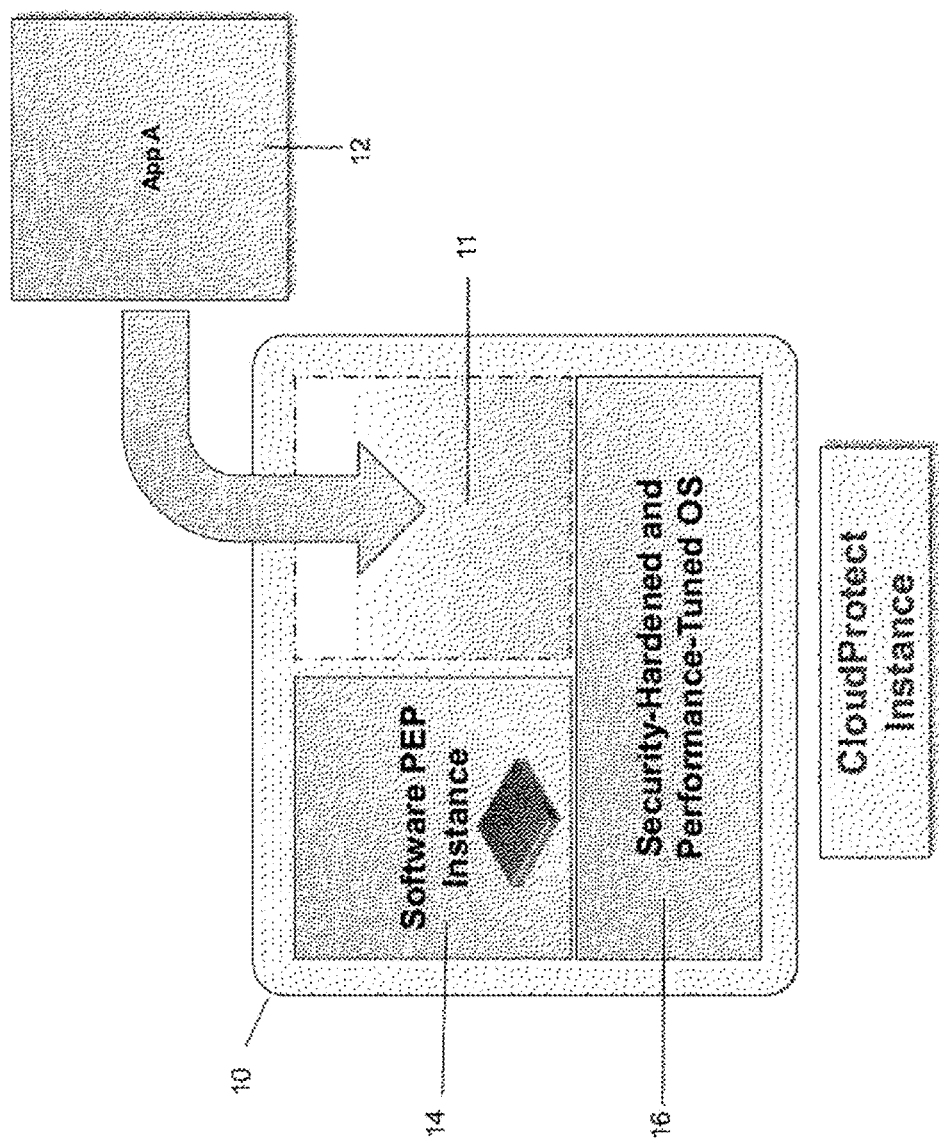
FIG. 6 shows the virtual appliance in accordance with the present invention.

In one embodiment, the present invention includes a secure, virtual PEP appliance 10, that allows applications to co-reside in its virtual image (also referred to herein as a CloudProtect™ image). Thus, the application inherits the secure operating baseline of the virtual PEP. This is illustrated in FIG. 6, in which an application 12 hosting services/APIs, called "app A" in the diagram, is installed in "slot" 11 in the CloudProtect base image. This application thus co-resides with the PEP 14 within a secure operating environment. This secure environment is delineated by the hardened operating system 16 that is the normal deployed OS for a PEP appliance, which may be either hardware-based or a virtualized equivalent.

One or more applications may be installed into a single CloudProtect image. The PEP can be configured to provide security and management services for every service/API in each application deployed in that image.

Application installation, also called provisioning, can be completely automated on CloudProtect so that it does not require direct operator intervention. This is very important in a cloud environment where there may be demands for rapid scale-up (or conversely, scale-down) in response to changing loads. Application provisioning onto the CloudProtect image should therefore lend itself to being driven by automated scripts so that it could be easily integrated with cloud management applications.

Figure 7:
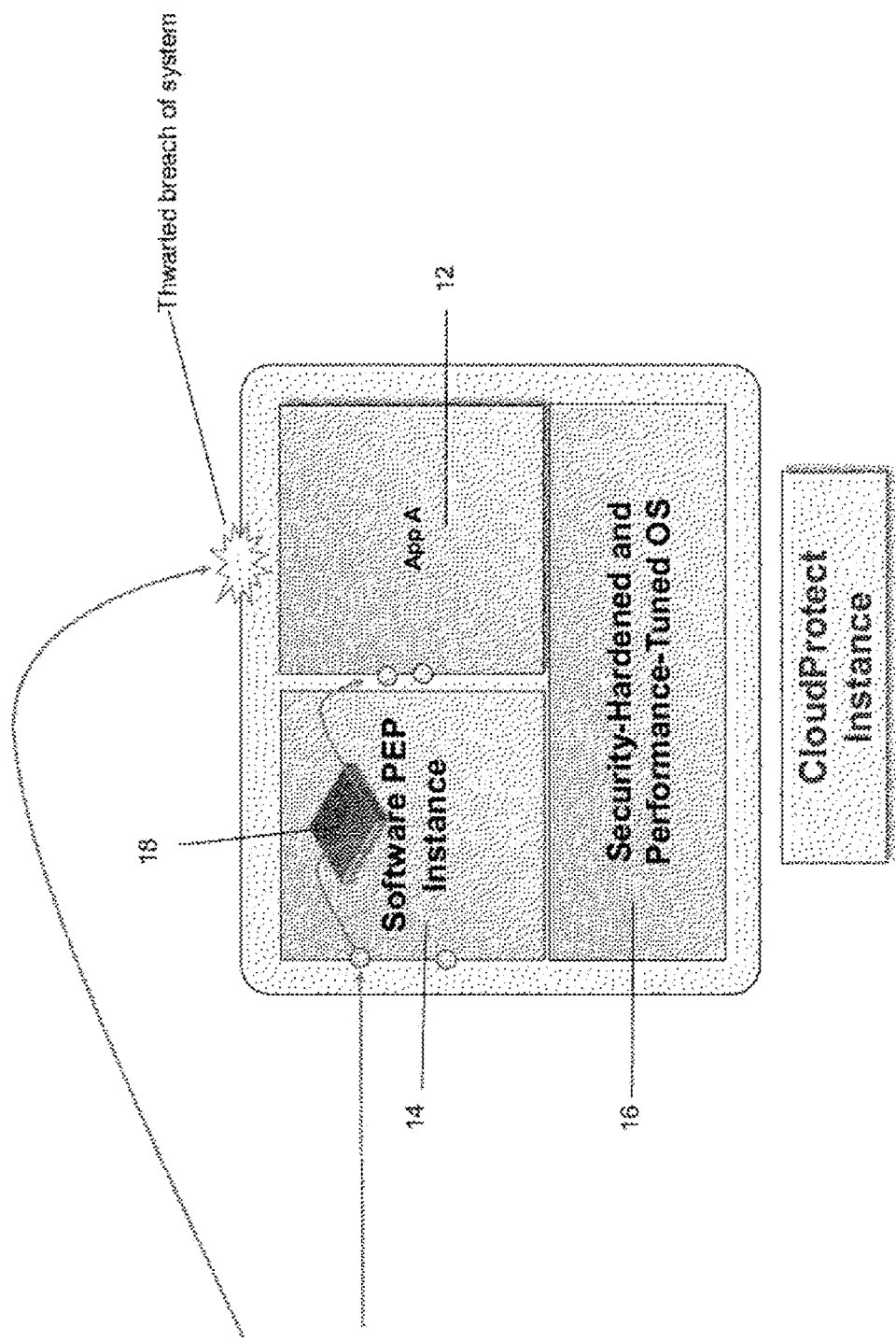
FIG. 7 the virtual appliance in accordance with the present invention and the passage of all communications to/from the application occurring via the PEP.

Ideally, all application protocol communications 18 to (and optionally from) the application are constrained to pass through PEP 14. This is illustrated in FIG. 7. This gives security administrators the ability to remotely manage the application by expressing constraints on communications through policy, as no outside connections can be made directly with applications hosted on the CloudProtect image without first going through the integral PEP instance.

PEP policies are expressed through a language featuring sequential processing steps, variables, conditional evaluation, branching, and inclusion mechanisms for shared policy fragments. Language elements are called assertions, and implement primitives used in security and management of services/APIs. Assertions can include functions for authentication, authorization, audit, transformation, rate limiting, threat detection, orchestration, transport mediation, confidentiality, integrity, etc.

The PEP policy language determines whether a message is to be relayed to the internal application service/API or not. This connection is made using a localhost identifier, thereby avoiding IP address dependencies that might cause connection ambiguities when policy is replicated across a cluster of CloudProtect instances.

Communications initiating from applications installed on CloudProtect instances to outside entities may also be subject to policy control, though this is at the discretion of the implementer. Constraints can be set within CloudProtect to disallow any outgoing communications that do not first pass through the PEP, and thus be subject to independent policy control. This is useful for audit purposes, but may also be used to increase security in the event that a CloudProtect application is compromised.

The integral CloudProtect plus application(s) instance is protected from compromise in a multi-tenant, Internet-connected environment because it is entirely self-contained. It can be viewed as a shrinking down of the enterprise perimeter security model to the level of the application, rather than an entire corporate network. A reasonable analogy is to view the corporate security perimeter model as similar to a castle, where the wall protect vulnerable buildings inside their perimeter. CloudProtect is like a suit of armour on an individual—protecting the vulnerable person inside, but allowing mobility beyond the castle walls. Just as each individual knight needs a suit of armour, so each application in the cloud needs a deployment on CloudProtect.

Figure 8:
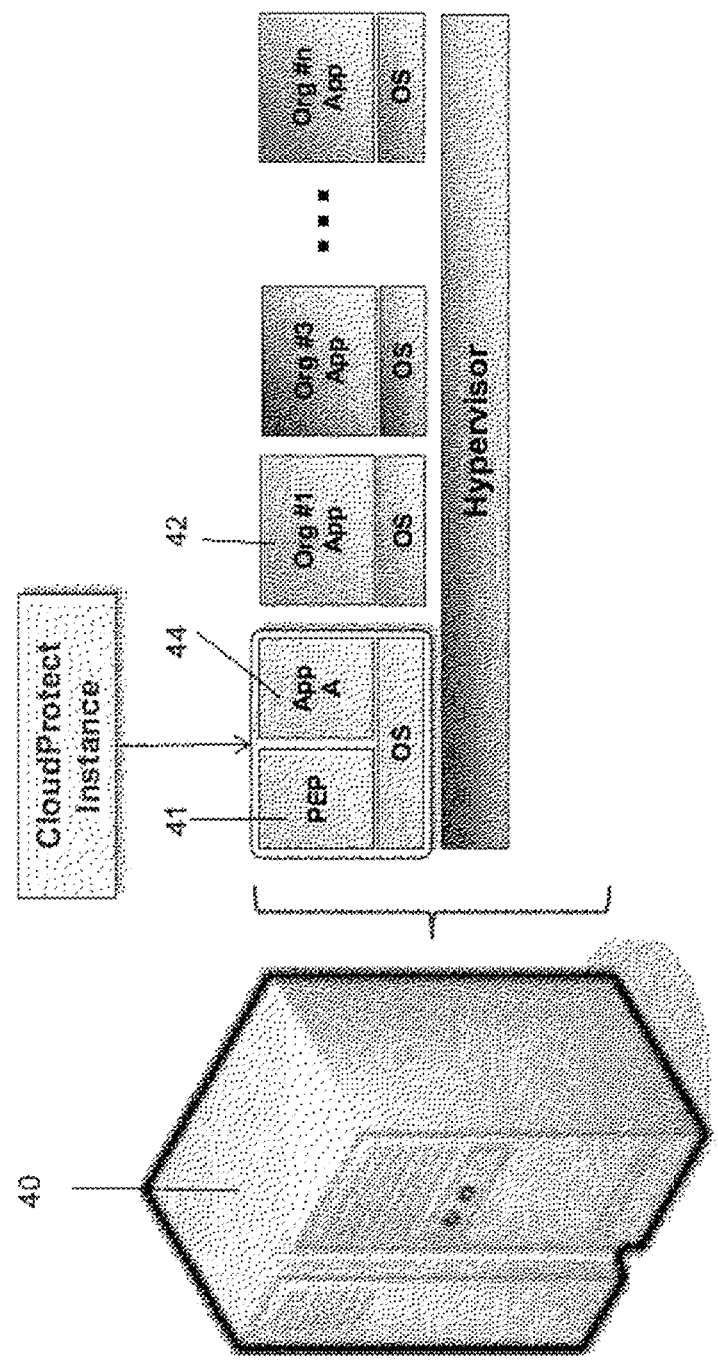
FIG. 8 illustrates the sharing a one hypervisor between "protected application stacks", as described herein and conventional non-protected application stacks.

Any other applications co-residing on the same hypervisor as a CloudProtect instance, or residing on other systems in a multi-tenant environment can only connect to the application by first passing through the integral CloudProtect PEP, which is the only service accepting communication connections (primarily TCP, but potentially stateless UDP packets as well). This is illustrated in FIG. 8 (counterpart to FIG. 5). The message relay from PEP to application is restricted to exclusively localhost connections.

It is preferred that the operating system is hardened to DMZ-standards, so the composite application stack of PEP plus user application resides on a secure base that is able to withstand sophisticated network attacks, both from the Internet and from other tenants in the IaaS provider's environment. CloudProtect does not guard against potential hypervisor attacks that may circumvent the basic hypervisor virtual image isolation mechanism. Such attacks are theoretical at present, but they do constitute a risk in all virtual computing environments.

Figure 9:
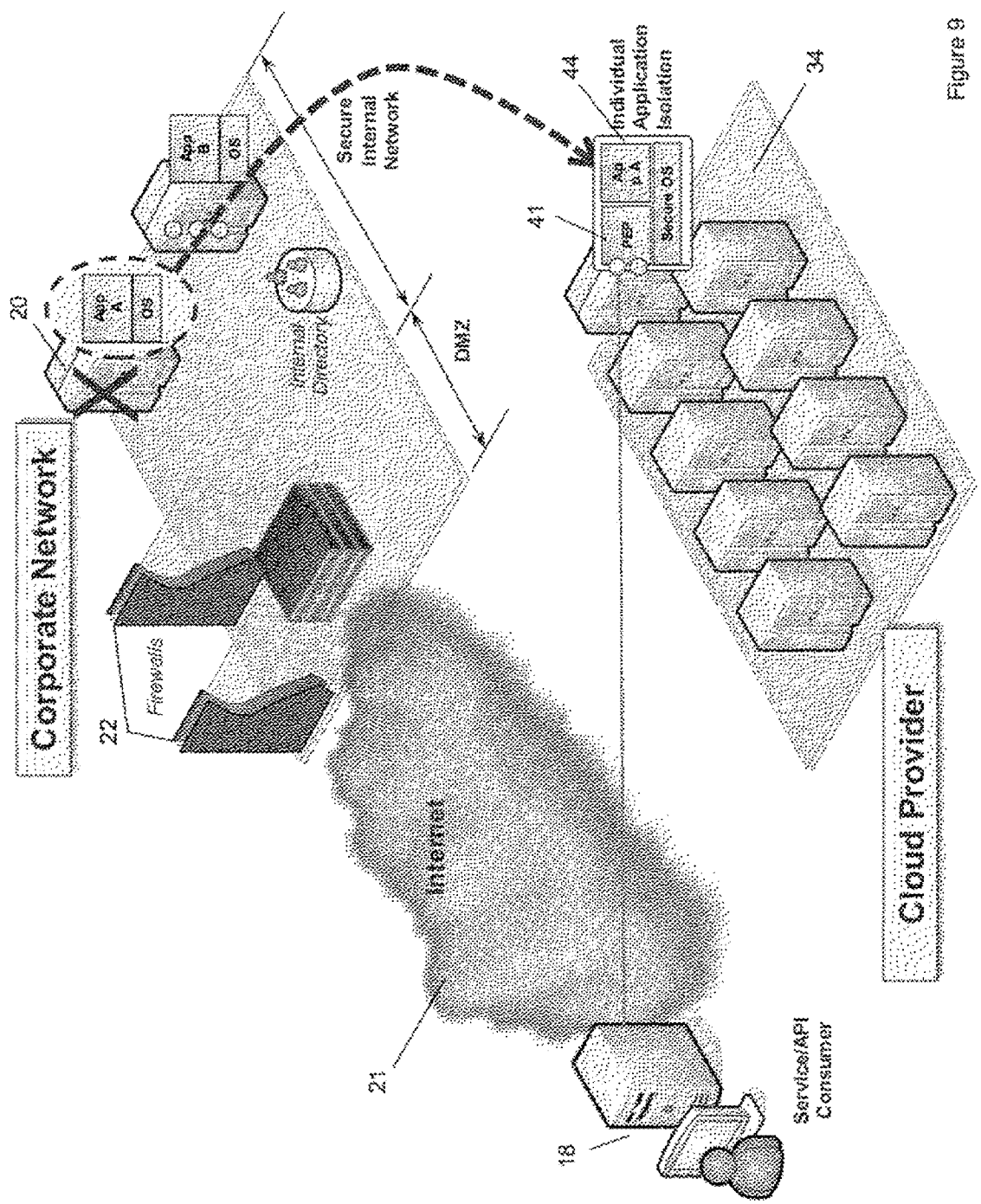
FIG. 9 is a counterpart of FIG. 4, but illustrating the benefit/feature of individual application isolation offered by the protected application stack/secure appliance of the present invention.

CloudProtect also guards against Internet-borne attacks, and provides access control for legitimate connections originating on the public Internet. This puts it in contrast to offerings such as Amazon's VPC, which will not accept direct connections from the Internet and only accept connections from other applications residing in the virtual domain, or those coming in from the on-premise organization network (these may have originated on the Internet but been subject to standard perimeter security policy to get into the enterprise internal network). Refer also to FIG. 9.

Figure 10:
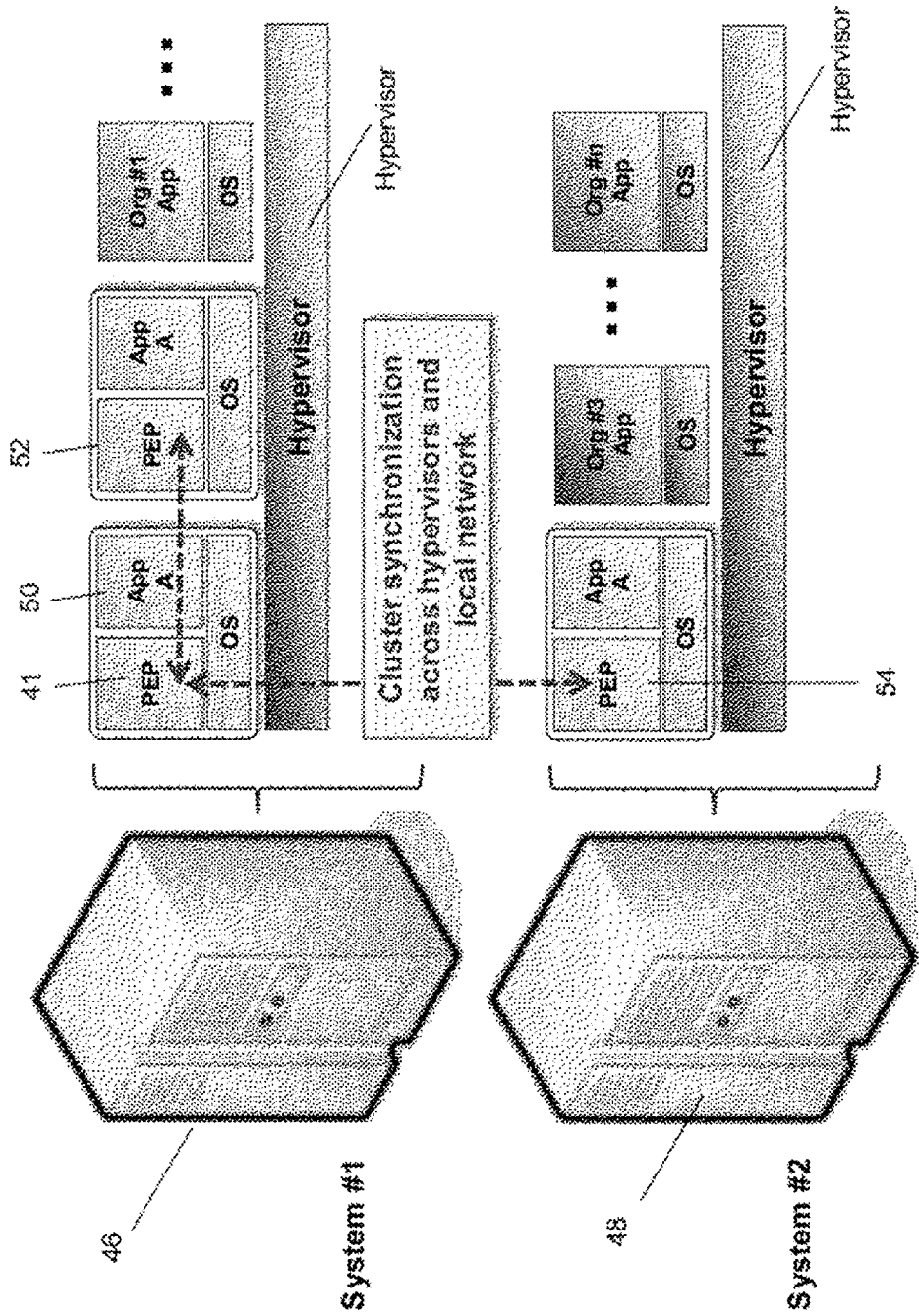
FIG. 10 illustrates an advantage of PEP or secure stack clustering in being able, among other things, to synchronize policy across multiple stacks.

In a further preferred embodiment, PEP clustering can also be leveraged to automatically synchronize policy and state information among multiple instances of CloudProtect. This provides a basis for fault tolerance and scalability that is consistent with the elastic computing model of the cloud. Each CloudProtect instance has the same view of policy, and locally hosts an instance of the application. CloudProtect instances can either be deployed on the same hypervisor, or anywhere in the multi-tenant environment. This is illustrated in FIG. 10 in which system 46 and 48 (cloud computers) each host protected application stacks (50, 52 and 54), which each share the same view of policy as each other. Likewise, even between 50, 52 and 54, across hypervisors, there is cluster synchronization.

Preferably, the CloudProtect cluster is fronted by an HTTP load balancer. This will automatically distribute traffic among instances, and shift load if any single CloudProtect instance fails.

The stacks are preferably designed such that no instance of CloudProtect is a single point of failure for the cluster. If any instance fails, the other can run independently. A CloudProtect cluster has a minimum of two database instances, a primary and a secondary. Running CloudProtect instances make use of the primary first. Writes to the primary database are replicated through to the secondary so that it represents a mirrored persistent store. If the primary fails, all CloudProtect instances automatically switch over to the secondary, which is elected the new primary. When the original primary is restored, it synchronizes with the new primary and adopts its new role of secondary database, the shadow store of the primary. This way, there is redundancy in the persistence layer and operations can proceed without interruption.

Note that clustering is also a mechanism for horizontal scaling. The applications deployed on the CloudProtect image must support scaling through horizontal deployment for this design pattern to scale.

The data gathered by the PEP as audits, logs, counters and metrics, can be used to provide service administrators with visibility into the current state of the application, as well as a window into the historical state of the application. This is the basis of application management through monitoring and recording of transactions in and out of the application through services/APIs. General audits, logs, counters and metrics are recorded automatically, but can be augmented under policy control. These can be accessed by corporate IT operations personnel (such as operators, security administrators, auditors, etc) using a secure connection from the administrator console application to the PEP. This connection is secured using SSL, and administrators are subject to authentication and authorization under a role-based access control (RBAC) system. Administrators can use username/password of X509.v3 certificates as a security token for identification. This is illustrated in FIG. 11. This figure further illustrates the appliance of the invention showing individual application 56 isolated within said appliance.

The secure administration console described above is also used to administer the lifecycle of policy. Policies can be composed, edited, activated, deactivated, deleted, versioned, rolled-back, tagged, etc. All of these standard administration operations on policy are accomplished through a GUI interface connecting securely to the PEP, or though a service/API made available on the PEP.

In a most preferred form, provides a cloud-based virtual appliance based on RedHat Enterprise Linux (RHEL). Customers use this image as a secure baseline to deploy their own applications. This preferred appliance features the hardened OS image that Layer 7 uses in its appliances which boots in a safe and resilient mode from first use. This RHEL distribution includes a fully functioning SecureSpan Gateway—that governs all calls to an application's APIs hosted on the secured OS. This appliance offers a secure console for visual policy authoring and management, allowing application developers, security administrators, and operators to completely customize the API security model based to their requirements. For example, if there is a need to add certificate-based authentication to an API, the present invention provides a means to simply drag and drop a single assertion into the policy.

Implementation Details

The CloudProtect image is based on a virtual image of a general purpose operating system. This could be Linux, Microsoft Windows, or a more specialized OS or OS-variant such as SELinux. The initial image is a standard installation so that it is compatible with updates. However, the OS must be significantly hardened for security and optimized for high performance as a virtual image so that is can be deployed where it may be subject to Internet attack.

Hardening the OS involves a number of steps to minimize potential avenue of exploitation. The first step is to install all necessary security patches. Not all security patches released for an OS are relevant for the CloudProtect operating model, so this is not an inclusive list of every security patch on an OS. The patching strategy is aligned to real potential threats.

Any unnecessary services and functions are deactivated. Only those services that are in direct support of the PEP are left operating. If a user application requires some of these services, they can be re-activated on a CloudProtect image; however, this may compromise the overall security model of that instance.

Only 3 services are permitted to run on the PEP: the database, the PEP instance, and the SSH daemon. These services can be constrained to specific virtual interfaces so that emerging cloud-based network isolation mechanisms can be leveraged to further decrease the security risk profile.

The OS system has no compilers present or tool chains that could be leveraged in an exploit. The only account accessible from SSH connections is a configuration account running a restricted shell and a menu-driven configuration program.

The CloudProtect PEP is a Java application, so buffer overflows are not a potential threat. Dynamic memory allocation at the language level eliminates the potential to abuse fixed buffer sizes to run attacker code.

CloudProtect also employs effective privileged separation. The PEP application does not run as a privileged user, but instead runs as user "gateway", a role account, ensuring that even if the server was somehow remotely compromised, the attacker cannot easily get to the underlying OS. Furthermore, it is not possible to log into the gateway account.

There is no IP-level routing in the PEP. The operating system does not route packets under any circumstances. Although PEP functionally superficially resembles a conventional firewall, most of the standard design concerns associated with IP-level firewalls are not applicable to this PEP. The PEP operates at a higher level of the networking stack than the standard IP level firewall. IP Firewalls usually deal with data on an IP packet level. This means that all that can really be known about a payload are characteristics such as the source IP, the packet size, and the destination.

In contrast to a router or firewall, the PEP operates on application layer protocols. These are much larger structures, encompassing entire XML documents. It applies data integrity checks that answer questions such as "Does the XML document have the correct XML name space and data types for the target service?", "Does this request message have a X.509 certificate from a trusted issuer?" or "Does this response message conform to the expected output, or should it be transformed to adapt to an older service/API that has not been updated recently".

These checks span hundreds of packets and cannot be implemented through packet inspection; instead, they require the entire message context to be complete. Thus, the PEP loads the entire message, subjects it to checks and tests, and if it passes all of these, only then relays this message to the service/APIs installed on the CloudProtect instance.

At the IP level, the PEP aggressively drops routed packets not destined for this appliance and ignores things like source routed packets, as these are not relevant in a non IP routing system. Although it is certainly quite easy to do complex message routing based on message contents with the PEP, this is explicit in the policy that the administrator develops, and there are no defaults that would allow a message through without being subject to explicit policy-based controls.

The message processing algorithm operates as follows:
1. PEP receives an inbound request message
2. It determines if there's an applicable policy
   a. Drop and log message if no policy found.
   b. Optionally drop front end TCP connection entirely rather than reveal any information to potential attacker
3. Load and run policy
   a. Policy may include steps such as authentication, authorization, audit, integrity checks, confidentiality processing, message transformation, rate limit, orchestration, transport mediation, etc
   b. Policy includes routing to service/API over localhost connection. In this case, it obtains a response message the service/API.
4. Return results to requesting systems. Note that a policy may be structured to not relay a message downstream, or to return nothing to a caller, based on state of any operation within the policy.

There are no default policies on the PEP. Each service/API must have an enabled policy to allow access. Unknown messages are dropped and logged. The system is designed to assume that all traffic is a compromise attempt until proven otherwise (this is an extension into the web services world of the IP layer firewall "drop by default" convention). There are no grace periods or cookie based windows of opportunity to compromise security using another context's security tokens.

Policy-driven threat detection includes explicit scans for XML threats such as coercive parsing, schema poisoning, external entity attacks, etc. Document structure threats (very large documents, very deep documents, very complex documents) are also implemented through explicit policy directives. More specialized attack signature detection can be implemented in policy where appropriate. This includes scanning for SQL injection signatures (these may be tuned to specific database instances such as Oracle or MS-SQLserver), and Cross-Site Scripting (XSS) attacks.

Networking is strictly limited on the CloudProtect instance. Ports 8080 and 8443 are enabled for HTTP and HTTPS connections. Additional ports include remote admin (SSH—port 22), remote gui admin (https—port 9443), remote RMI for log viewing (RMI—port 2124), data storage subsystem (JDBC—port 3306), replay protection channel (Multicast UDP port 8777+one random high numbered port).

The CloudProtect instance leverages built-in firewalling in the OS to restrict connections. This makes use of Linux iptables. The set of firewall rules includes:
   ICMP rate limiting (ping flood protection).
   Illegal packet detection and denial
   Drop of all packets not destined for specific systems. Industry best practices "Drop by default"
   OS masquerading
   CloudProtect appears to some port scanners as a Windows NT system running CheckPoint Firewall 1
   Optional Port forwarding to allow administrators to listen on arbitrary privileged ports without a privileged process.
   Optional Connection rate limiting (prevent DDOS of app services)
   Source IP and interface limits for connections on data server nodes
   Optional OS level source IP checking for all inbound requests
   Policy based source IP, Time of day request checking Applications running on the CloudProtect instance can be restricted from making outgoing connections using functions available in SELinux. These functions can restrict the application so that it can only make localhost connections. Thus, the only way for it to communicate with entities off of the CloudProtect instance is to go through the PEP and be subject to policy (which may deny the connection). This pattern adds to overall security because at attacker who compromises the application is unlikely to be able to use this as a platform to launch subsequent attacks.

The system according to the invention is implemented using conventional computers having an input, an output, a processor, and a memory. The computers output will include means to communicate with other computers via a network, which may include a cloud computing network.

The present invention provides a secure appliance for use within a multi-tenant cloud computing environment which comprises:
   a) a policy enforcement point (PEP);
   b) a hardened Operating System (OS) capable of deploying applications; and
   c) at least one application capable of hosting services and application program interfaces (APIs).

The appliance as claimed may be virtual on a cloud computer with the desired application residing therein. The appliance with the application inherits a secure operating baseline of the virtual PEP.

A baseline image with integrated PEP functionality, which preferably includes one or more of the following: access control, message transformation, routing, rate limiting, orchestration, monitoring, or any other means allowing an organization to re-assert control over its applications despite deployment in an IaaS-type cloud.

A system for providing security in communications between a first computer and a second computer, said second computer being within a cloud computing environment, comprising:
   a) a virtual image of an operating system (OS) on said second computer, said operating system having restricted shell access and said operating system including a firewall;
   b) a policy enforcement point (PEP) installed on said operating system image, said PEP being capable of receiving communications to said second computer, retrieving a policy based on characteristics of said communication and executing said policy on said communication, such that if said policy allows for said communication to reach said second computer, this may be implemented using local host addressing to transmit said communication.

The system as described wherein PEP and at least one application, operating system and PEP are compressed onto a secure appliance. The system wherein the first computer is a user computer and the second computer is within a cloud computing environment.

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

Further, in the methods taught herein, the various acts may be performed in a different order than that illustrated and described. Additionally, the methods can omit some acts, and/or employ additional acts.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

The invention claimed is:

1. A server computer, comprising:
a memory, the memory stores a set of policy constraints; and
a set of hardware processors in communication with the memory, the set of hardware processors executes a hypervisor, the hypervisor executes a first virtual policy enforcement point appliance, the first virtual policy enforcement point appliance runs a first operating system that includes a firewall, the first operating system runs a first application and a first policy enforcement point, the first virtual policy enforcement point appliance restricts all application layer communication to and from the first application to pass through the first policy enforcement point, the first policy enforcement point controls all application layer communication to and from the first application based on the set of policy constraints.

2. The server computer of claim 1, wherein:
the set of hardware processors receives a message from a second server different from the server computer, the first policy enforcement point determines whether to pass the message to the first application based on the set of policy constraints.

3. The server computer of claim 1, wherein:
the first virtual policy enforcement point appliance provides individual application isolation for only the first application.

4. The server computer of claim 1, wherein:
the set of hardware processors executes a second application, the first policy enforcement point controls all application layer communication from the second application to the first application based on the set of policy constraints.

5. The server computer of claim 4, wherein:
the first application communicates with the first policy enforcement point using a localhost connection.

6. The server computer of claim 1, wherein:
the first policy enforcement point communicates with the first application using exclusively localhost connections.

7. A system, comprising:
a first hardware processor, the first hardware processor executes a hypervisor, the hypervisor executes a first virtual policy enforcement point appliance, the first virtual policy enforcement point appliance runs a first operating system that includes a firewall, the first operating system runs a first application and a first policy enforcement point, the first virtual policy enforcement point appliance restricts all application layer communication to and from the first application to pass through the first policy enforcement point, the first policy enforcement point controls all application layer communication to and from the first application based on a first set of policy constraints; and
a second hardware processor, the second hardware processor in communication with the first hardware processor, the second hardware processor executes a third application, the first policy enforcement point controls all application layer communication from the third application to the first application based on the first set of policy constraints.

8. The system of claim 7, wherein:
the hypervisor executes a second virtual policy enforcement point appliance, the second virtual policy enforcement point appliance runs a second operating system that includes a second firewall, the second operating system runs a second application and a second policy enforcement point, the second virtual policy enforcement point appliance restricts all application layer communication to and from the second application to pass through the second policy enforcement point.

9. The system of claim 8, wherein:
the second operating system is different from the first operating system.

10. The system of claim 8, wherein:
the second policy enforcement point controls all application layer communication to and from the second application based on the first set of policy constraints.

11. The system of claim 7, wherein:
the first virtual policy enforcement point appliance provides individual application isolation for only the first application.

12. The system of claim 7, wherein:
the first application communicates with the first policy enforcement point using a localhost connection.

13. The system of claim 7, wherein:
the first policy enforcement point communicates with the first application using exclusively localhost connections.

14. A system, comprising:
a first hardware server, the first hardware server executes a hypervisor, the hypervisor executes a first virtual policy enforcement point appliance, the first virtual policy enforcement point appliance runs a first operating system that includes a firewall, the first operating system runs a first application and a first policy enforcement point, the first virtual policy enforcement point appliance restricts all application layer communication to and from the first application to pass through the first policy enforcement point, the first policy enforcement point controls all application layer communication to and from the first application based on a first set of policy constraints; and
a second hardware server, the second hardware server executes a third application, the first policy enforcement point controls all application layer communication from the third application to the first application based on the first set of policy constraints.

15. The system of claim 14, wherein:
the first hardware server receives a message from the second hardware server, the first policy enforcement point determines whether to pass the message to the first application based on the first set of policy constraints.

16. The system of claim 15, wherein:
the hypervisor executes a second virtual policy enforcement point appliance, the second virtual policy enforcement point appliance runs a second operating system that includes a second firewall, the second operating system runs a second application and a second policy enforcement point, the second virtual policy enforcement point appliance restricts all application layer communication to and from the second application to pass through the second policy enforcement point.

17. The system of claim 16, wherein:
the second operating system is different from the first operating system.

18. The system of claim 14, wherein:
the first application communicates with the first policy enforcement point using a localhost connection.

19. The system of claim 14, wherein:
the first virtual policy enforcement point appliance provides individual application isolation for only the first application.

* * * * *